3,165,417
HIGH STRENGTH BERYLLIA ARTICLES
Percy P. Turner, Jr., Cincinnati, Ohio, assignor to the United States of America as represented by the United States Atomic Energy Commission
No Drawing. Filed Oct. 26, 1960, Ser. No. 65,240
12 Claims. (Cl. 106—43)

This invention relates to the inhibition of grain growth in high purity beryllia at high temperatures and more particularly to the addition of carbon or metal carbides to beryllia to repress such grain growth. All articles made from beryllia which contain either carbon or refractory carbide additives have enhanced strength at high temperatures.

During the course of work directed towards utilizing beryllia (BeO) in a nuclear reactor it became apparent that massive and preferential growth of beryllia grains adversely affected the strength of densified components made therefrom. This grain growth was evident after prolonged heating above 2500° F. and at 2750° F. and above it was particularly severe. Such grain growth must be inhibited in order to realize the maximum strength properties from densified beryllia.

Accordingly, the direct object of this invention is to inhibit the grain growth of beryllia at high temperatures. A fine-grained microstructure is necessary in order to realize maximum strength properties. Accordingly, the ultimate object of this invention is to produce beryllia with strength properties at high temperatures not heretofore attainable.

The prior art provides no solution to this problem. In certain preliminary experiments, from 0.1 to 0.8 weight percent of a number of high melting metals and metal oxides were added to high purity beryllia in the hope that these additives might inhibit grain growth. The metal oxides and metals used in these experiments included $Al_2O_3$, BaO, $Cr_2O_3$, $Ga_2O_3$, $SiO_2$, $TiO_2$, $ThO_2$, $Y_2O_3$, $BaO \cdot 6Al_2O_3$, $BeO \cdot Cr_2O_3$, $MgO \cdot Al_2O_3$, $2MgO \cdot SiO_2$ $TiO_2 \cdot Al_2O_3$
Ge, Mo, Pt and Th. It was found that none of these additives was effective in stopping this undesired grain growth.

However, it was unexpectedly found that the addition of from 0.1 to 0.2 weight percent of carbon or a refractory metal carbide did inhibit this undesired grain growth. Additions of 0.1 to 0.2 weight percent of carbon, ZrC, $Be_2C$ or $Cr_3C_2$ to high purity beryllia were made, and beryllia articles were made from these mixtures by pressing and sintering. Microstructure examination of these articles after they had been heated in the 2500° F. to 2750° F. range showed that grain growth had been restrained.

In preparing beryllia articles having high strength properties in accordance with the present invention, the following procedure was observed. From 0.1 to 0.2 weight percent of the carbon and refractory carbide additives were intimately mixed with high purity beryllia and pressed into specimens one-half inch diameter by one-eighth inch thick, using a pressure of 20,000 pounds per square inch (p.s.i.), followed by sintering for two hours at 2950° F. in hydrogen. The inhibitors used included carbon, $Be_2C$, $Cr_3C_2$, and ZrC powders added singly in amounts of 0.1 to 0.2 weight percent. One sample of each composition was examined in the as sintered condition, after 150 hours at 2500° F. in air, and after 150 hours at 2750° F. in air. Each was sectioned, polished, and grain size measured with the results shown in the following table.

GRAIN SIZE OF BeO WITH VARIOUS ADDITIVES

| BeO Plus | Percent of Theo. Sint. Dens. | Grain Size in Microns | | |
|---|---|---|---|---|
| | | As Sintered | After 2,500° F. | After 2,750° F. |
| Nothing | 97.7 | 13–25 | | 35–590 |
| 0.1% C | 98.77 | 25–51 | 25–51 | 25–101 |
| 0.2% C | 98.34 | 13–44 | 13.44 | 25–62 |
| 0.1% $Cr_3C_2$ | 98.40 | 36–123 | 36–144 | 36–245 |
| 0.2% $Cr_3C_2$ | 97.39 | 25–44 | 25–72 | 36–101 |
| 0.1% $Be_2C$ | 98.46 | 25–72 | 36–101 | 25–123 |
| 0.2% $Be_2C$ | 97.96 | 25–51 | 25–72 | 25–101 |
| 0.1% ZrC | 98.44 | 36–123 | 36–123 | 51–123 |
| 0.2% ZrC | 98.42 | 36–101 | 36–101 | 44–101 |

While the beryllia specimens mentioned in the above table were pressed at 20,000 p.s.i. and sintered at 2950° F., satisfactory specimens can be produced at pressures of 10,000 to 50,000 p.s.i. and temperatures of 2800° F. to 3300° F. In contrast to the data given in the above table, pure beryllia shows massive and preferential grain growth when heated for 150 hours at 2750° F. resulting in grains ranging from about 35 to 600 microns. It is obvious that each of the additives afforded grain growth inhibition and that carbon was the most effective inhibitor.

Resort may be had to such modifications and variations as fall within the spirit of the invention and the scope of the subjoined claims.

I claim:

1. The method of making a beryllia article having a restricted grain growth above 2500° F. which consists of intimately mixing from 0.1 to 0.2 weight percent of an inhibitor selected from the group consisting of carbon and refractory carbides with highly purified beryllia, pressing at about 10,000 p.s.i. to about 50,000 p.s.i. and sintering at temperatures of from about 2800° F. to about 3300° F. in a hydrogen atmosphere.

2. The method of making a beryllia article having a restricted grain growth above 2500° F. which consists essentially of intimately mixing from 0.1 to 0.2 weight percent of carbon with highly purified beryllia, pressing at about 10,000 p.s.i. to about 50,000 p.s.i. and sintering at temperatures of from about 2800° F. to about 3300° F. in a hydrogen atmosphere.

3. The method of making a beryllia article having a restricted grain growth above 2500° F. which consists of intimately mixing from 0.1 to 0.2 weight percent of refractory carbide with highly purified beryllia, pressing at about 10,000 p.s.i. to about 50,000 p.s.i. and sintering at temperatures of from about 2800° F. to about 3300° F. in a hydrogen atmosphere.

4. The method of claim 3 wherein the refractory carbide is $Cr_3C_2$.

5. The method of claim 3 wherein the refractory carbide is $Be_2C$.

6. The method of claim 3 wherein the refractory carbide is ZrC.

7. A beryllia article having a restricted grain growth above 2500° F. which consists of high purity beryllia intimately mixed with from 0.1 to 0.2 weight percent of a grain growth inhibitor selected from the group consisting of carbon and refractory carbides.

8. A beryllia article having a restricted grain growth above 2500° F. which consists of high purity beryllia intimately mixed with from 0.1 to 0.2 weight percent carbon.

9. A beryllia article having restricted grain growth above 2500° F. which consists of high purity beryllia intimately mixed with from 0.1 to 0.2 weight percent of a refractory carbide.

10. The beryllia article of claim 9 wherein the refractory carbide is $Cr_3C_2$.

11. The beryllia article of claim 9 wherein the refractory carbide is $Be_2C$.

12. The beryllia article of claim 9 wherein the refractory carbide is ZrC.

References Cited by the Examiner
UNITED STATES PATENTS

| | | | |
|---|---|---|---|
| 1,418,527 | 6/22 | Burgess | 75—150 |
| 1,879,589 | 9/32 | Tama | 106—55 |
| 2,013,625 | 9/35 | Buck | 106—56 |
| 2,025,616 | 12/35 | Rohn | 7—5150 |
| 2,121,084 | 6/38 | Kruh | 75—150 |
| 2,176,906 | 10/39 | Kjellgren et al. | 75—150 |
| 2,389,061 | 11/45 | Kuzmick | 106—56 |
| 2,538,959 | 1/51 | Ballard | 106—55 |
| 2,818,605 | 1/58 | Miller | 18—55 |
| 2,982,619 | 5/61 | Long | 106—55 |
| 3,082,521 | 3/63 | Cohen | 75—150 X |
| 3,117,001 | 1/64 | Crossley | 29—182.5 |

FOREIGN PATENTS 478,016   1/38   Great Britain.

OTHER REFERENCES

Reactor Handbook, second ed., vol. I, Materials, Tipton, editor; pages 151–152, 931.

Technical Progress Rpt., September 1955; NMI–1139, pages 32–37.

WADC Tech. Rpt. 57–86, January 1957 (also NSA–11: 10524).

Nuclear Science Abstracts, May–June 1960, 14: 8666.

WADC Tech. Rept. 57–32, May 1957 (also NSA–11: 8908).

TOBIAS E. LEVOW, *Primary Examiner.*

ROGER L. CAMPBELL, CARL D. QUARFORTH,
*Examiners.*